A. J. SEARS.
EXTENSION TOP FOR AUTOMOBILES.
APPLICATION FILED JUNE 30, 1916.
1,232,103.
Patented July 3, 1917.
2 SHEETS—SHEET 1.
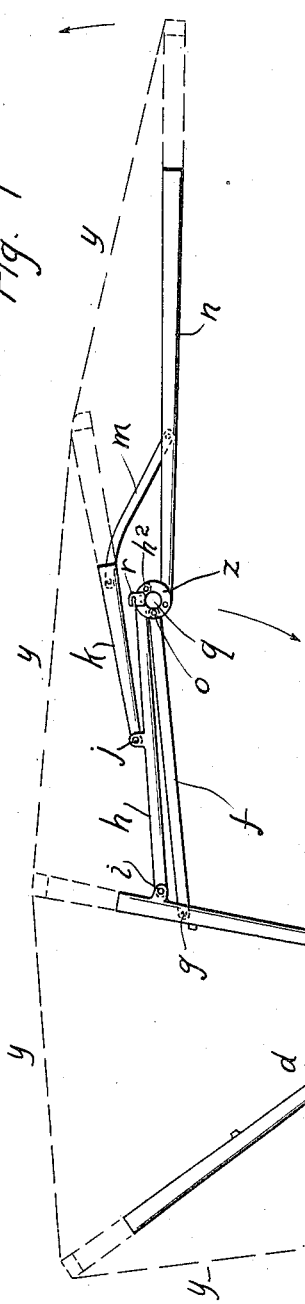
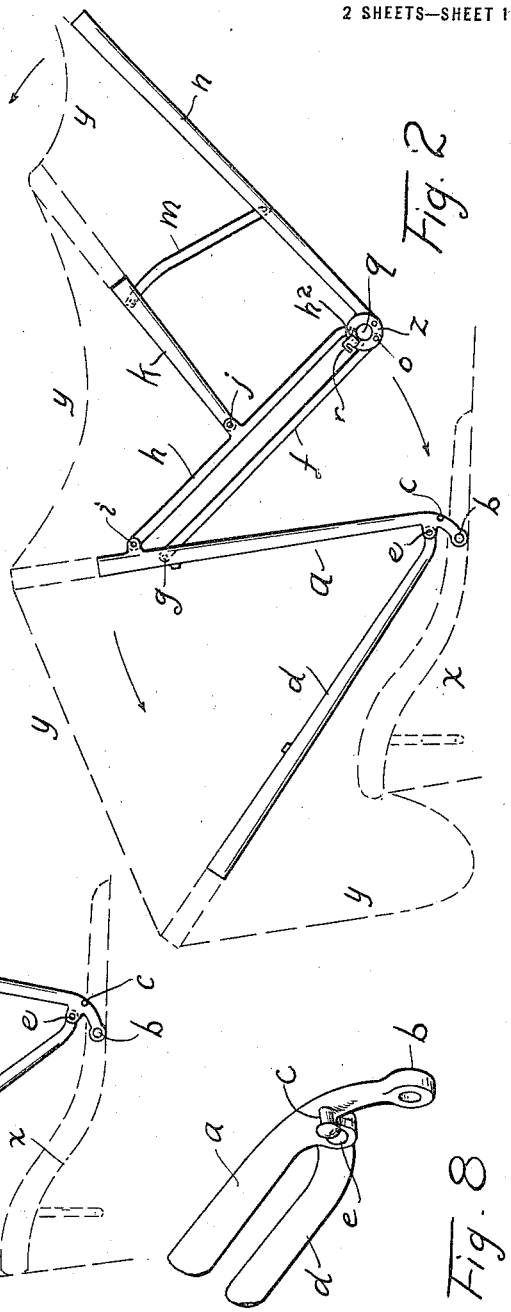
INVENTOR
Alfred J. Sears
BY Rozemond A. Parker
ATTORNEY

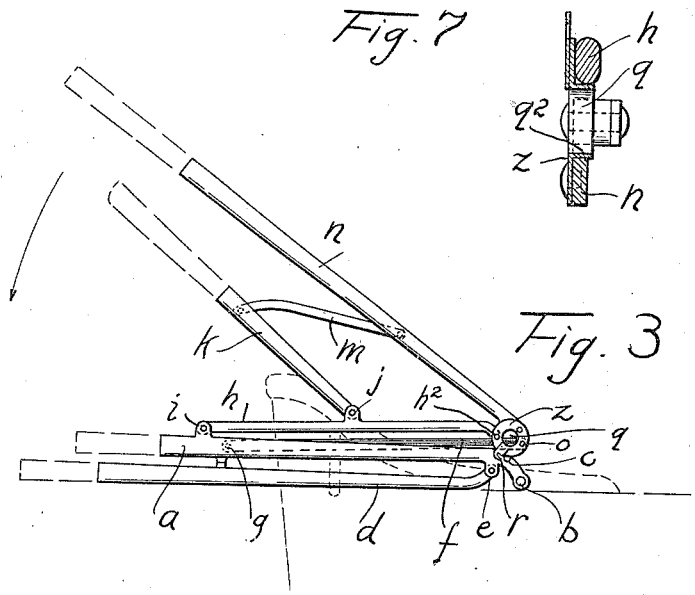
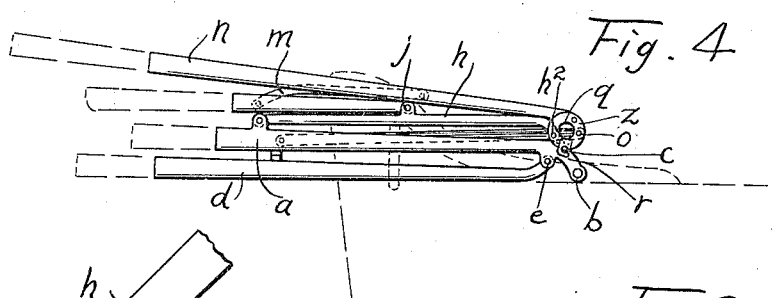
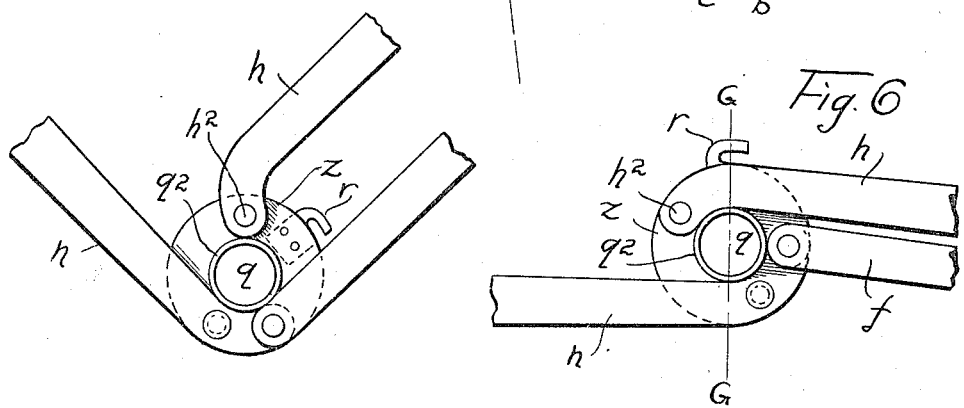

UNITED STATES PATENT OFFICE.

ALFRED J. SEARS, OF DETROIT, MICHIGAN, ASSIGNOR TO DETROIT FORGING COMPANY, OF DETROIT, MICHIGAN.

EXTENSION-TOP FOR AUTOMOBILES.

1,232,103. Specification of Letters Patent. Patented July 3, 1917.

Application filed June 30, 1916. Serial No. 106,915.

*To all whom it may concern:*

Be it known that I, ALFRED J. SEARS, a citizen of the United States, residing at Detroit, county of Wayne, State of Michigan, have invented a certain new and useful Improvement in Extension-Tops for Automobiles, and declare the following to be a full, clear, and exact description of the same, such as will enable others skilled in the art to which it pertains to make and use the same, reference being had to the accompanying drawings, which form a part of this specification.

My invention relates to extension tops for automobiles and an object of my improvements is to provide an improved extension top that is automatically and definitely limited in its extending motion and one that is balanced in all of its positions of transition from the folded to the extended state and is supported within itself when extended.

In the accompanying drawings:

Figure 1 is a side elevation of so much of an extensible top as is necessary to illustrate my invention, the part of the automobile to which it is pivoted being indicated in broken lines.

Fig. 2 is a side elevation of the same partly broken away showing the parts partly folded.

Fig. 3 is a similar view of Fig. 2 showing the parts folded to a greater extent.

Fig. 4 is a view similar to Figs. 2 and 3 the parts being completely folded or "clashed."

Fig. 5 is a detail view showing the inside of the joint uniting the three links shown in Fig. 1, the joint being in an intermediate position.

Fig. 6 is a similar view of the joint shown in Fig. 5, the parts being in the relative position which they take when the top is completely extended.

Fig. 7 is a detail section on the line G—G Fig. 6.

Fig. 8 is a perspective view of adjacent ends of the bows $a$ and $d$.

The rear seat of the automobile is indicated at $x$ and the broken lines $y\ y\ y$ indicate the cover or cloth extending over the bows of the top.

$a$ is the main bow of the top pivoted in the usual form at $b$ to the side of the seat of the vehicle. $c$ is a lug extending laterally from the lower end of the bow $a$. $d$ is an auxiliary bow pivoted at $e$ to the main bow $a$ and constituting the usual form of such support for the cover. $z$ is a disk having an aperture $q$ formed axially therethrough and having an inwardly extending annular flange $q^2$ around the opening $q$.

$n$ is an extension bow having its inner end curved in the usual way, the curved end of said bow being riveted to the disk $z$, its inner curved end engaging the flange $q^2$ as shown most distinctly in Fig. 6.

$h$ is a link pivoted at $i$ to a lug extending from the main bow $a$ and at its other end pivoted at $h^2$ to the disk $z$. The pivot $h^2$ being so located that when the top is extended, as shown in Figs. 1 and 6, the concaved curved bow near the end of said link is engaged against the flange $q^2$ on the disk $z$. $f$ is a second link pivoted to the main bow $a$ adjacent and somewhat below the pivot $i$ and at its other end pivoted at $o$ to the disk $z$ below the pivot $h^2$.

$r$ is a hook or latch secured to the disk $z$ and adapted to engage over the pin or lug $c$ (Fig. 8) to hold the top from accidental displacement when clashed, as shown in Fig. 4.

$k$ is a bow pivoted to the link $h$ intermediate its end pivots and acting to support the top or cover $y$. $m$ is a link connecting the bows $k$ and $n$ at intermediate points in their lengths.

While I prefer to use the disk form for the connection $z$ between the adjacent ends of the bow $n$ and links $a$ and $f$ still other forms of connection may obviously be used in this position to operate in the same way and secure the same object, thus coming broadly within my invention.

The operation of the above described apparatus is as follows:

When the top is folded together as shown in Fig. 4 the hook $t$ engages over the lug $c$ and thus holds the part from being accidentally displaced from the jar of the vehicle or otherwise. However, if the bow $n$ is first turned the hook $r$ will be disengaged from the lug $c$ and then the framework may be extended in the usual way.

The links $h$ and $f$ are approximately parallel and as the frame is expanded they carry the bow $n$ positively to its correct extended position, as shown in Fig. 1. The link $h$ then comes against the side of the flange $q^2$ and acts as a lug to prevent further relative turning in that direction of the disk $z$ and arm $h$. Thus the frame is positively held in its extended position.

In all intermediate positions the parts are substantially balanced so that very little effort is required to move them from one position to the other. In the extended position the link $f$ acts as a strut to help support the overhanging portion of the top.

The upper link has the pivot at its outer end beyond the vertical through the pivot at the outer end of its companion link so that the weight coming upon the outer link is more firmly supported by the united action of the two links.

What I claim is:

1. In a top, the combination of a forward bow $n$, a lug extending laterally therefrom having a cylindrical outer surface and a flange extending in a plane at right angles to its axis at its inner end, a link having a curved end pivoted to said flange and adapted to engage with the curved surface of its end against the cylindrical surface of said lug to limit the relative angular motion of said link and bow.

2. An element in a top frame construction consisting of an annulus having a cylindrical flange extending from its inner edge in combination with a rod pivoted to said annulus and having a curved formation corresponding to the curvature of said flange adapted to engage said flange.

In testimony whereof, I sign this specification.

ALFRED J. SEARS.